US007992050B2

(12) United States Patent
Melamed (10) Patent No.: US 7,992,050 B2
(45) Date of Patent: Aug. 2, 2011

(54) METHOD AND APPARATUS FOR CHECKING INSTALLED AND EXECUTED SYSTEMS

(75) Inventor: Menachem Melamed, Ra'anana (IL)

(73) Assignee: SAP Portals Israel Ltd., Raanana (IL)

(*) Notice: Subject to any disclaimer, the term of this patent is extended or adjusted under 35 U.S.C. 154(b) by 418 days.

(21) Appl. No.: 12/124,183

(22) Filed: May 21, 2008

(65) Prior Publication Data
US 2009/0292959 A1 Nov. 26, 2009

(51) Int. Cl.
*G06F 11/00* (2006.01)
(52) U.S. Cl. .......................................... 714/45; 714/37
(58) Field of Classification Search .................. 714/37, 714/45, 46, 57; 715/736
See application file for complete search history.

(56) References Cited

U.S. PATENT DOCUMENTS

| | | | | |
|---|---|---|---|---|
| 5,781,720 A | * | 7/1998 | Parker et al. | 714/38 |
| 6,104,868 A | * | 8/2000 | Peters et al. | 709/202 |
| 6,658,586 B1 | * | 12/2003 | Levi | 714/4 |
| 6,918,066 B2 | * | 7/2005 | Dutta et al. | 714/46 |
| 7,379,600 B2 | * | 5/2008 | Derks et al. | 382/218 |
| 7,441,158 B1 | * | 10/2008 | Legako et al. | 714/46 |
| 7,493,520 B2 | * | 2/2009 | Bhatia | 714/38 |
| 2004/0044992 A1 | * | 3/2004 | Muller et al. | 717/124 |

* cited by examiner

*Primary Examiner* — Joshua Lohn

(57) ABSTRACT

A method and apparatus for comparing two computing platforms installed with instances of an application, a portal or another computerized unit, wherein one computerized unit malfunctions when executed by the corresponding computing platform.

The method and apparatus query the two computing platforms and the two instances for a multiplicity of values associated with a multiplicity of parameters that may influence the functionality, compare the parameter values and report the differences to a user, in order to enable the user to locate the root cause of the problem. The parameters may relate to the instances as well as to the computing platforms and their environment.

The parameter retrieval and comparison can be performed by the apparatus, or by components of the instances for handling proprietary data types.

34 Claims, 5 Drawing Sheets

System Compare Results

| systems | ilnwrefl4_50208 | liltlvh254_50008 | comment |
|---|---|---|---|
| installed DC's: | 538 | 861 | common DC's:222 |
| Missing DC's: | 639 | 316 | installed on the other machine |

| differences in common DC's | SUM |
|---|---|
| different build or CL | 222 |
| different installation mode | 2 |

Missing DCs | Build and CL | Installation | Service | applications

Service list

| Service name | server 1 | server 2 |
|---|---|---|
| CUL | Not exist | started |
| com.portal.coll.gov.forcerestart | Not exist | stopped! |

METHOD AND APPARATUS FOR CHECKING INSTALLED AND EXECUTED SYSTEMS

TECHNICAL FIELD

The present disclosure relates to system installations in general, and to a method and apparatus for locating problems with installed computerized systems, in particular.

BACKGROUND

When installing systems, for example computerized systems such as applications or portals, many types of problems may occur. Some problems may occur during installation, whether the installation does not succeed and the system is not installed at all, or the installation is completed but installation errors are reported. However, even if the installation of the system goes well and no problems are reported, the system may still not function as expected. The system may not function at all, may provide only some of the expected functionality, or function incorrectly or in sub-optimal manner. Installation and execution problems may be caused by a variety of reasons, including but not limited to: the used hardware equipment, such as CPU, memory, available disk space; operating system; registry; pre-required systems such as database installations, J2EE versions, .NET versions; portal contents; installed and activated or paused services, and their versions and updates; log and trace files; language, time zone or other regional settings; installed version and available updates for each component of the application or portal; component installation order; deployed components and deployment order; connectivity parameters such as internet or internet connectivity parameters; configurations; user settings; authorizations; and others.

Some systems, such as enterprise systems installed in enterprises, are first installed on a testing environment used exclusively for these purposes, such as a dedicated computer, on which intensive quality assurance, tests, corrections, and adjustments are performed. Only when the testing results are satisfactory, the system is installed on production environments, i.e., on one or more additional computers.

In such situations, it sometimes happens that while the testing environment fully functions as expected, one or more of the production environments does not function at all, functions partially, or produces incorrect or otherwise suboptimal results. In another typical scenario, an enterprise may use an enterprise system, which includes several identical sub-systems. In such systems, wherein all subsystems are expected to behave identically, but practically some of the sub systems function differently from others, or do not function at all. The problem can stem from multiple sources in either the testing environment and/or in the production environment, and may not be easy to find. Locating and correcting the problem may cause serious problems, such as downtime, timetable delays and others.

Thus there is a need for a method and apparatus for detecting problems in systems installed on computers such as production environments, when another system such as a testing environment, is available, wherein one systems is believed to function satisfactorily while the other one does not, or when the two systems provide some functionality and it is not clear which one functions well and which does not.

SUMMARY

A method and apparatus for comparing two installed versions of a system, in order to understand why one of them functions or malfunctions differently form the other.

In a preferred embodiment of the disclosure there is thus provided in a computer network comprising a first computing platform and a second computing platform, the first computing platform executes or has installed thereon a first instance of a computerized unit, and the second computing platform executes or has installed thereon a second instance of the computerized unit, wherein the first instance of the computerized unit malfunctions on the first computing platform, an apparatus for retrieving the differences between the first computing platform and first instance, and the second computing platform and second instance, the apparatus comprising: a component for receiving access details of the first computing platform or of the second computing platform; a data requesting component for issuing a request for information related to the first computing platform or the second computing platform or the first instance or the second instance; a data retrieval component for retrieving a first value from the first computing platform or from the first instance and a second value from the second computing platform or from the second instance; a comparison component for retrieving one or more differences by comparing the first value and the second value; and a component for reporting the differences. The apparatus can further comprise an external computing unit for comparing the first value and the second value. The apparatus can further comprise an external reporting unit for reporting the differences. Within the apparatus, the component for receiving access details is optionally a user interface component. Within the apparatus, the component for receiving access details is optionally a communication component for communicating with another entity. Within the apparatus, the data requesting component optionally requests a parameter value from the first computing platform or from the second computing platform. Within the apparatus, the data requesting component optionally requests the data from a daemon executed by the first computing platform or from the second computing platform. Within the apparatus, the data requesting component optionally requests a parameter value from the first instance or from the second instance. Within the apparatus, the data requesting component optionally requests data from a storage unit, wherein the data was retrieved offline and stored in the storage unit. Within the apparatus, the data requesting component optionally requests a list of parameters from the first instance or from the second instance. Within the apparatus, the list of parameters further optionally comprises for each parameter one or more items selected from the group consisting of: a value; additional data; comparison instructions, Application Program Interface for comparing; Application Program Interface for reporting; an address of an executable unit for comparing; and an address of an executable unit for comparing. Within the apparatus, the first instance or the second instance optionally comprise the comparison component or the reporting component. Within the apparatus, the request for information optionally relates to one or more items selected from the group consisting of: hardware equipment; CPU; memory; disk space; operating system; registry; database installation; J2EE version; .NET version; portal contents; an installed service, an activated service, a paused service or a version or an update thereof; log or trace file; language; time zone; a regional setting; an installed version or update for a component of the first instance or the second instance; component installation order; deployed component or deployment order; connectivity; an internet parameter; a configuration; a user setting; and an authorization. The apparatus is optionally executed by the first computing platform or the second computing platform or by a third computing platform. The apparatus optionally comprises a component for issuing one or more recommendations to the user or a component for automatically performing the recommendations.

Another aspect of the disclosure relates to a method in a computer network comprising a first computing platform and a second computing platform, the first computing platform executes or has installed thereon a first instance of a computerized unit, and the second computing platform executes or has installed thereon a second instance of the computerized unit, wherein the first instance of the computerized unit functions on the first computing platform, and the second instance of the computerized unit malfunctions on the second computing platform, the method used for retrieving the differences between the first computing platform and first instance, and the second computing platform and second instance, the method comprising the steps of: receiving access details of the first computing platform or the second computing platform; requesting data related to the first computing platform or the second computing platform or the first instance or the second instance; receiving a first value associated with a parameter from the first computing platform or from the first instance; receiving a second value associated with the parameter from the second computing platform or from the second instance; comparing the first value and the second value; and if the first value is different from the second value, reporting the difference between the first value and the second value to a user. Within the method, comparing the first value and the second value is optionally performed by the first instance or by the second instance, or by an external tool. Within the method, reporting the difference between the first value and the second value is optionally performed by the first instance or by the second instance, or by an external tool. Within the method, the access details are optionally received from a user or from a computerized unit. Within the method, the first value is optionally received from the first computing platform, the first instance, or a daemon executed by the first computing platform. Within the method, the second value is optionally received from the second computing platform, the second instance, or a daemon executed by the second computing platform. Within the method, the data received from the first instance or the second instance or the first instance or the second instance optionally comprises a parameter identifier and a parameter value. Within the method, the data optionally comprises additional data related to the parameter; comparison instructions; Application Program Interface for comparing the first value and the second value; Application Program Interface for reporting the difference; an address of an executable unit for comparing the first value and the second value; or an address of an executable unit for reporting the difference. Within the method, the requested data optionally relates to one or more items selected from the group consisting of: hardware equipment; CPU; memory; disk space; operating system; registry; database installation; J2EE version; .NET version; portal contents; an installed service, an activated service, a paused service or a version or an update thereof; log or trace file; language; time zone; a regional setting; an installed version or update for a component of the first instance or the second instance; component installation order; deployed component or deployment order; connectivity; an internet parameter; a configuration; a user setting; and an authorization. The method is optionally executed by the first computing platform or the second computing platform, or by a third computing platform. Within the method, the step of requesting data optionally comprises requesting the data from a storage unit. The method optionally comprises the steps of issuing one or more recommendations to the user or automatically performing the recommendations.

Yet another aspect of the disclosure relates to a computer readable storage medium containing a set of instructions for a general purpose computer, the set of instructions comprising: receiving access details of a first computing platform or a second computing platform; requesting data from the first computing platform, or the second computing platform, or a first instance executed by or installed on the first computing platform, or a second instance executed by or installed on the second computing platform; receiving a first value associated with a parameter from the first computing platform or from the first instance; receiving a second value associated with the parameter from the second computing platform or from the second instance; comparing the first value and the second value; and if the first value is different from the second value, reporting the difference between the first value and the second value to a user.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION

A one embodiment of the disclosure is optionally used in situations where two instances of an application, portal, service or another computerized unit are installed or executed on two computing platforms, wherein one instance functions as expected while the other one does not. Alternatively, there may be situations in which none of the instances functions correctly, but each presents different problems, or in which it is not clear which one of the systems functions correctly and which does not. In such situations, the problem can stem from one or more out of many factors, including the underlying hardware of the platforms, operating system, basic utilities, databases, the installed application itself, previous versions or upgrades of the applications or additional factors. In order to locate the differences and determine why one system functions and the other one does not, and preferably to understand the root cause for this behavior, a user is offered the option to compare the two systems.

The user provides the access details of the platform which is believed to be malfunctioning, for example a production platform, and of the baseline platform which is believed to be functioning as expected, for example a testing platform or a reference platform, and receives a list of all relevant differences between the systems.

The presentation and comparison can be performed by one of the instances of the application, i.e. the application as executed by the testing platform or as executed by the production platform. Alternatively, the comparison can be performed by a tool external to the application. The comparison can thus be executed by any platform having access to the malfunctioning platform and the baseline platform, including but not limited to the testing and production platforms. In an alternative embodiment, the details associated with one or two of the systems can be retrieved and stored in another location, such as a file or a database to which the tool has access. Thus, it is not necessary that the tool has access to the two systems being compared. In yet another alternative, a snapshot comprising all details of a system known or believed to be functional may be stored in an accessible location, and serve as a reference system to which all other systems in the organization can compare themselves. Such snapshot can even be provided by the provider of the tested application after being adapted to the specific organization.

The tool can retrieve data external to any application, such as data related to hardware, operating system, database, or the like of the computing platform the application is executed by. In preferred embodiments of the disclosure, additional data is provided by the application itself, via an Abstract Program Interface (API). The application is accessed and queried by the external tool through the API, and reports to the tool various parameters, and optionally a way to report and compare such parameters. If an external tool is used to query the applications, and the presentation or comparison manner is unknown to the tool, for example if the parameters are of proprietary format, then an extension is preferably installed to the tool or otherwise introduced to the tool for carrying out the comparison or reporting presentation. In yet another embodiment, the application itself carries out the comparison between two parameter values, also via an API.

By default, the user optionally receives a report of all differences between the systems, and does not have to specify required aspects. Alternatively, the user can specify aspects he or she believes to be of importance to the particular problem, such as application version or upgrade, operating system, or others.

In a preferred embodiment, the differences are shown in a flat list, for example each aspect of the hardware such as processor type, hard disk size or others, the operating system version, the version of every installed file, or the like is shown separately. In another preferred embodiment, the aspects are grouped and a general indication appears for each aspect group, such as hardware, application installation, or others, and for each group there is an indication whether differences were encountered for this aspect group. When this presentation is used, the user can drill down and further reveal differences in the aspect. For example, if the existence of differences is reported for hardware, drilling down will present differences in the processor, memory, disk space or the like; differences in the installed version will show differences in the last installed version, in the last update, or others. The presented report can further comprise an estimated significance of the differences to the functionality.

Figure 1:
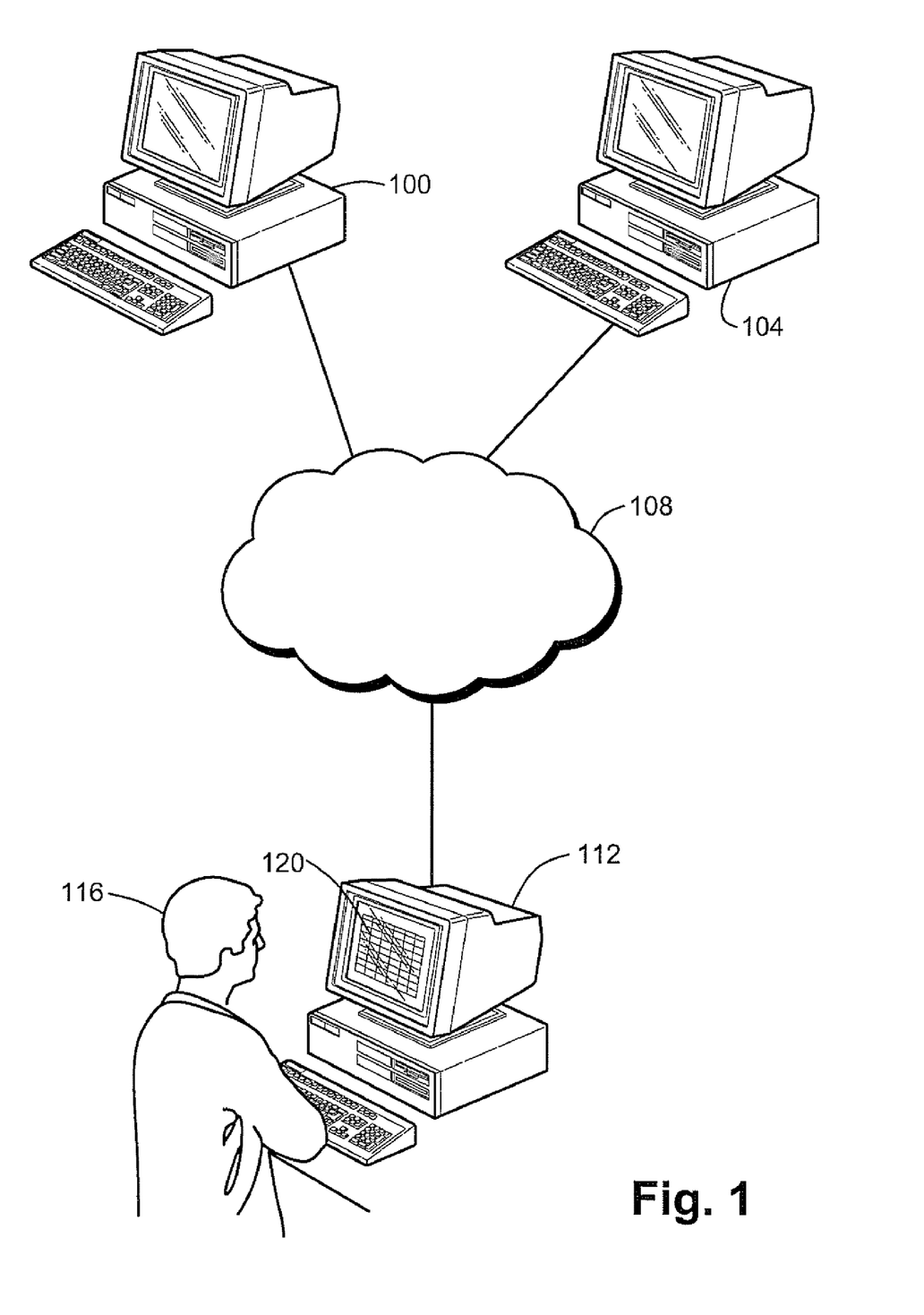
FIG. 1 is a schematic illustration of a typical environment in which the disclosed methods and apparatus are used.

Referring now to FIG. 1, showing a schematic illustration of a typical environment in which the disclosed invention is used. The environment comprises a computing platform 100, on which a particular application, portal, executable, service or the like is executed. Platform 100 is used as a baseline, i.e., the application, portal or executable is assumed to be functioning in a satisfactory manner. Platform 100 is optionally a testing platform, a reference platform or a baseline platform. The environment further comprises a second computing platform 104, referred to as production platform which is executing the same application, portal, executable, service or others, as platform 100. The application is not executed properly by platform 104. In a preferred embodiment of the disclosure, a tool is executed on a third computing platform 114 used by user 116 for comparing the environment and application as executed by platform 100 and platform 104. The comparison results are preferably shown as one or more tables, such as table 120 shown on a display device 112 associated with platform 114.

Platforms 100, 104 and 114 can be any general purpose processor, such as a personal computer, a mainframe computer, or any other type of computing platform that is provisioned with a memory device (not shown), a CPU or microprocessor device, and several I/O ports (not shown). The tool is preferably implemented as a computerized unit comprising one or more sets of interrelated computer instructions, arranged as an executable, service, script, module, or the like. The computing platforms communicate via any wired or wireless communication channel, such as RF, a local area network, a wide area network, the Internet, Intra-net, telephone network, voice over IP and the like, employing commonly used protocols such as but not limited to TCP, IP, IPTV or derivatives thereof.

In another preferred embodiment, the tool can be executed by platform 100 or by platform 104, and not on a third computing platform. The tool optionally comprises parts independent of the examined application, for retrieving information from various aspects of the environments, such as hardware, operating systems or others. Further aspects can be retrieved from the instances of the applications, such as versions of various files, deployment order or others. The data is preferably retrieved from the applications via APIs. In this embodiment, the same tool can be used for comparing instance pairs of multiple applications. In such embodiments, some parameters are retrieved by the tool or an associated module for any application type, and application-specific parameters are retrieved by the application itself. In this embodiment, if the comparison manner for a particular parameter is not known to the tool, an extension is optionally installed enabling the tool to compare such data. For example, if a numeric parameter is considered to be identical if one value exceeds in at most ten percents the other value, then a computerized unit performing such comparison should be introduced to the tool. Alternatively, the comparison instructions can be provided by the application or by the computing platform with the parameter or with the value. In yet another preferred embodiment, the application itself implements another API for comparing two parameter values and reporting to the tool whether the values are considered different or not.

In another embodiment, the tool is implemented as part of the application or portal rather than as an external tool. In this embodiment, all parameters to be retrieved and compared are retrieved and compared by the tool, and no general-purpose parameters are retrieved by another component. With this embodiment, the application itself is responsible for retrieving, presenting, and comparing all relevant data. In this embodiment, one instance of the application queries itself as well as the other instance for their parameters, and then compares and presents the parameter pairs and comparison results.

Figure 2A:
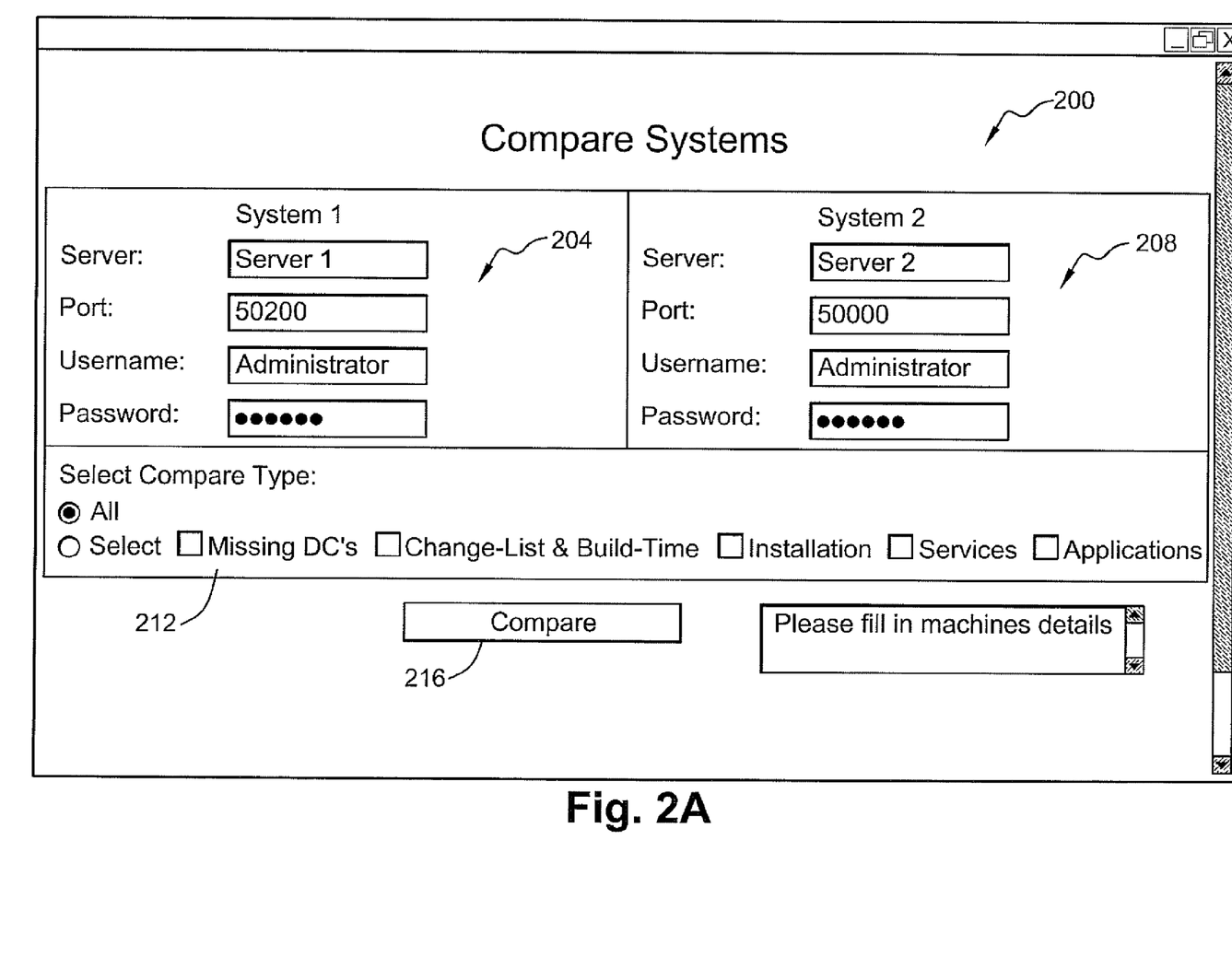
FIG. 2A is a schematic illustration of the activation screen of a computer program according to the disclosed methods and apparatus.

Referring now to FIG. 2A, showing a schematic illustration of the activation screen of a computer program in accordance with the disclosure. The program can be an independent program or a feature of another program such as a dedicated tool, or even of the application under discussion, which functions differently on two platforms, or functions properly on one platform and malfunctions on another platform. The activation screen, generally referred 200, comprises panes 204 for entering the details of a first system, and pane 208 for entering the details of a second system. In the particular example shown in FIG. 2A, the user is prompted to enter for each system the name of a server executing the application, the port number, a user name and password. The user can further select comparison type, and limit the comparison to one or more aspects associated with the application using pane 212. After the user fills the details for the two systems, and optionally the comparison details, pressing or otherwise pointing at Compare button 216 will activate retrieval and comparison. A person skilled in the art will appreciate that the shown user interface is exemplary only, and that other indications to the compared systems may exist, such as supplying physical addresses. Further, the user interface may be used for comparing more than one pair of applications, in which case the user will also have to indicate the name or another identifier of the application whose functionality he wishes to compare. For some applications the user name or password may not be necessary. It may also be the case that other details, including other comparison types may be required. The required comparison types may further be selected via a configuration file, registry entries or any other mechanism.

Figure 2B:
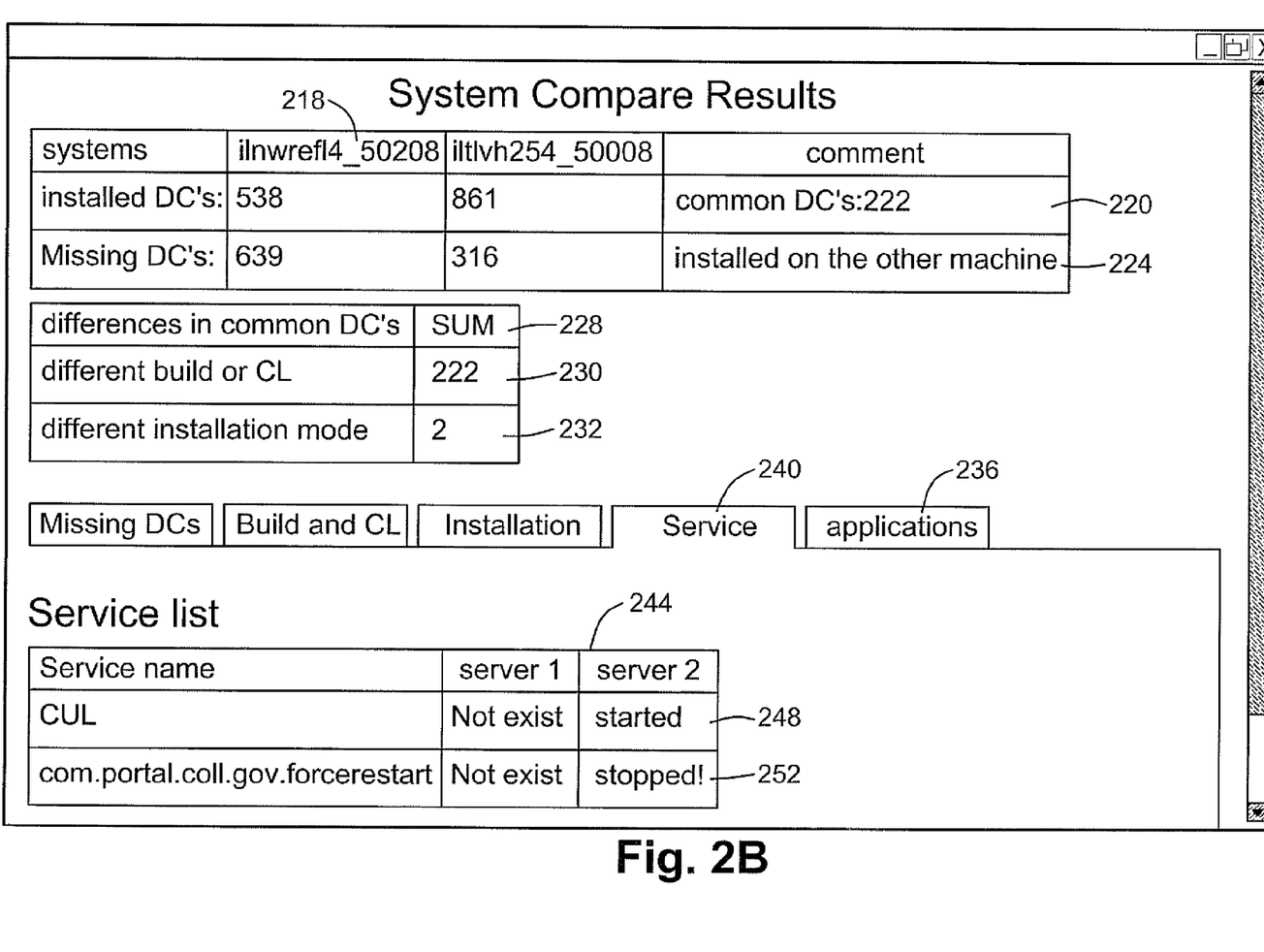
FIG. 2B is a schematic illustration of the results returned by a computer program according to the disclosed methods and apparatus.

Referring now to FIG. 2B, showing a schematic illustration of the comparison results returned by the computer program initiated via the user interface of FIG. 2A, in accordance with the disclosure. The comparison results comprise pane 218 which shows the number of installed deployment components (DCs) in each of the compared system on line 220, the number of missing DCs in each system on line 224, and pane 228 showing the differences in the DCs common in both systems. The comparison results further comprise tabs 236. When clicking or otherwise pointing on any of tabs 236, relevant information is shown. For example, when tab Services 240 is selected, a table 244 is shown listing the differences in the services executed by each system. For example, line 248 shows service CUL which does not exist on the first server, and has been started on the second server, and line 252 showing service Forcerestart that does not exist on the first server and was stopped on the second server.

A person skilled in the art will appreciate that the shown user interface is exemplary only, and that other presentation options may be used without deviating from the spirit of the disclosure. For example, different parameters can be constantly displayed similar to panes 218 and 228, and different, additional or less tabs can be selected from tabs 236, such as tabs relating to hardware, operating system, database, software and others. In yet other presentation options, the whole presentation can be constant, the whole presentation can be selectable, or any other combination thereof.

Figure 3:
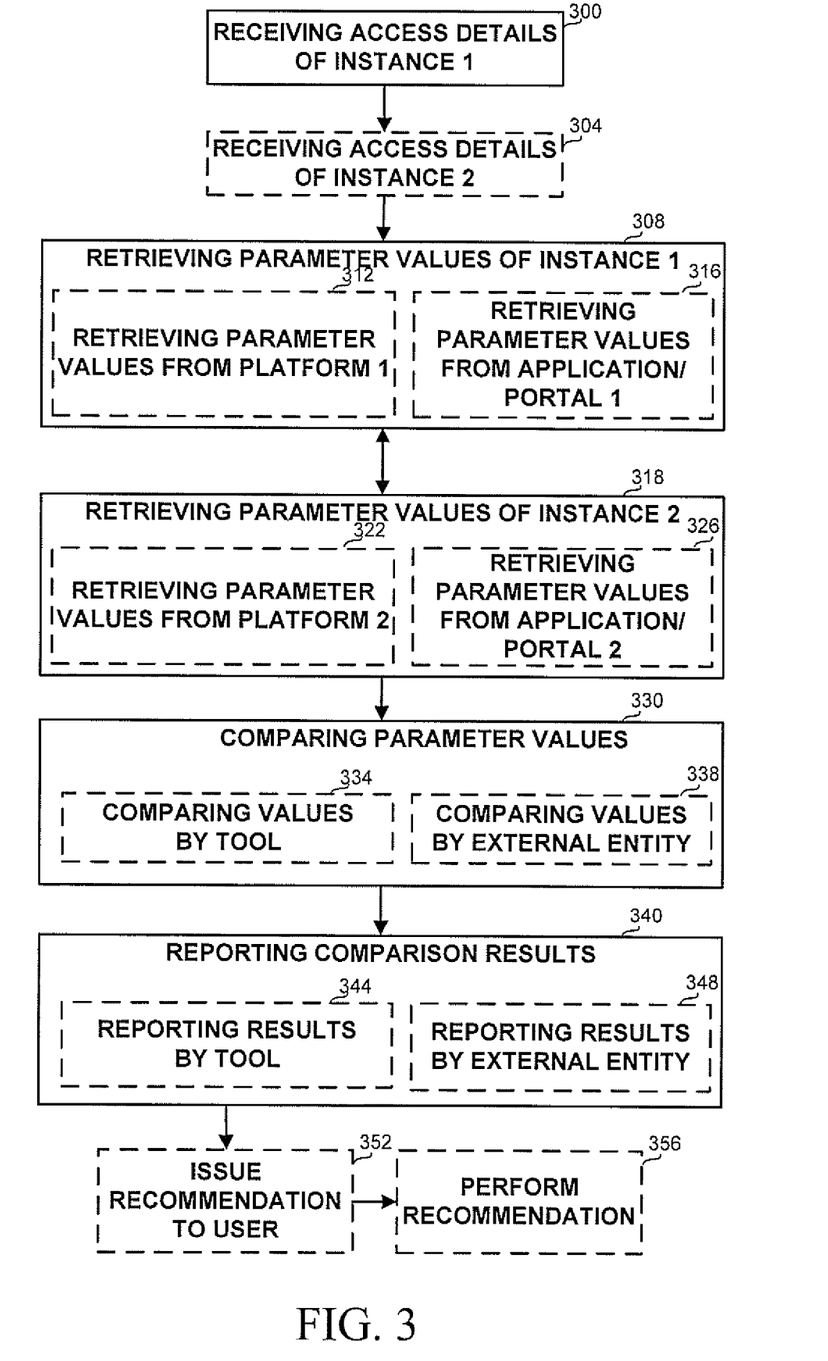
FIG. 3 is a flowchart of the main steps in a preferred embodiment of a method of the disclosure.

Referring now to FIG. 3, showing a flowchart of the main steps in a preferred embodiment of a method of the disclosure On step 300 the access details of a first instance, which can be an application, a portal, a web service or any other programming unit providing functionality, are received. The details preferably include any one or more of the following: the address or name of a computing platform on which the system is performed, port, username, password or any other details required for accessing the instance. If the method is activated from a general purpose tool that can compare multiple applications, an identifier of the application, portal, service, executable, or the like the functionality of which is tested, is also received.

On optional step 304, the same details, or other access enabling details, are received for the second instance. The first or the second instance is preferably a functioning instance while the other one is malfunctioning, but this is not required by the method, which can also be activated for two functioning or two malfunctioning instances. Step 304 is optional since the method can be activated from one of the instances, in which case only the access details of the other instance are required.

The access details for the first or the second instance are optionally received from a user using a user-interface, or from another entity such as a computer program, via a an API of the tool performing the disclosed method, from a communication channel, or the like.

On step 308, parameter values are retrieved for instance 1. Step 308 comprises optional substep 312 in which parameter values are retrieved from the computing platform or environment on which instance 1 is executed, and on substep 316 parameters are retrieved from the first computerized unit, such as the application, portal, service or the like. Step 312 is preferably performed by directly querying the computing platform or environment, for example by accessing the hardware, the registry or otherwise generally-available mechanisms, or by querying a programming unit, such as a daemon executed by the environment of instance 1. The queried parameters are determined by the querying unit, or by a daemon executed on the first computing platform which provides the parameters, for example in XML format. Alternatively, the daemon can be queried and respond for one parameter at a time. On step 316, parameters are retrieved from the application, portal, service or the like itself, for example parameters related to its components, their versions, updates, or the like. The parameters are preferably provided by the application or portal in a format comprising the parameter name or other identification, value, and optionally additional data, or reporting or comparison manner. The format can be XML or any other format complying with these requirements. If the comparison or reporting manner is not available to the apparatus of the disclosure, for example if the relevant parameters are of proprietary format, the response can include the location of a computerized unit for performing the comparison or reporting, or alternatively an API function within the application or portal, which can be called for performing the comparison or reporting. It will be appreciated that step 312 or step 316 can be omitted, and all parameters can be obtained from the environment or from the application or portal itself.

Steps 318, 322 and 326 are corresponding to step 308, 312, and 316, for retrieving parameter values from the second instance and its environment. Whether the parameter retrieval steps are performed by one of the instances or by an external program is irrelevant. The application or portal itself should provide interface for providing the value of a particular parameter, or a list of parameters together with their values and optionally a function or location of a function for reporting for comparing the values, regardless of which entity calls consumes the responses. It will be appreciated that the relative order of steps 308 and 318 is not material. Thus, steps 308 and 318 can be performed simultaneously or any one of them before the other.

It will be further appreciated that the details of either instance 1 or instance 2 can be retrieved off line, and stored in a location such as a database. Then, when the need rises to compare, only the details of one instance are retrieved according to step 308 or step 318, while the details of the other system are downloaded from where they are stored. This mechanism enables the tool to operate without having access to the two systems being compared, but rather to one of them, and to a storage unit on which the details of the other system are stored.

On step 330 the parameter values retrieved from the first instance and the second instance are compared. Step 330 comprises substep 334 in which values are directly compared by the tool. Step 334 takes place for straight-forward comparisons, such as string comparison, integer comparisons, or complex comparisons for which an extension such as a plug-in was supplied to the tool. On step 338 comparisons are performed by an entity external to the tool, such as one of the instances, which provides API for comparing two values. For example, such comparison can determine two different versions to be equal as far as a particular aspect, optionally indicated as additional data, is concerned.

Alternatively, the comparison instructions can be provided by the first or the second instance or computing platform.

Either step 334 or step 338 can be omitted, if comparison is performed solely by the tool performing the method or solely by the external entity.

On step 340 the results are reported to the user or to an external entity such as another program. The results are reported in any required format, including graphic, table, text, XML, or the like. The results can be sent to a user as e-mail or fax, published in a web site, or the like. The results can be reported in detail for every compared entity, or in groups which can be drilled down. Optionally, only the results indicating a difference between the two instances are reported. However, the tool can be configured, or a user can choose to see also the non-different results. Reporting step 340 optionally comprises step 344 for reporting straight-forward results, such as strings or integers, which is preferably done by the tool performing the disclosed method. Step 344 also includes reporting using extensions of the tools intended for reporting particular types of results. Reporting step 340 optionally comprises step 348 for reporting results by an external tool, such as one of the instances, which provides API for reporting a comparison result. Either step 344 or step 348 can be omitted, if reporting is performed solely by the tool executing the method or solely by the external entity.

On optional step 352, recommendations can be made to a user how to fix the problem, based on the found differences. For example, if the only differences found relate to the installed version of a component such as an application, a database, an operating system or the like, a recommendation can be made to upgrade the component. If performing the recommendation can be done without intervention, step 356 of automatically performing the recommendation is optionally taken.

Figure 4:
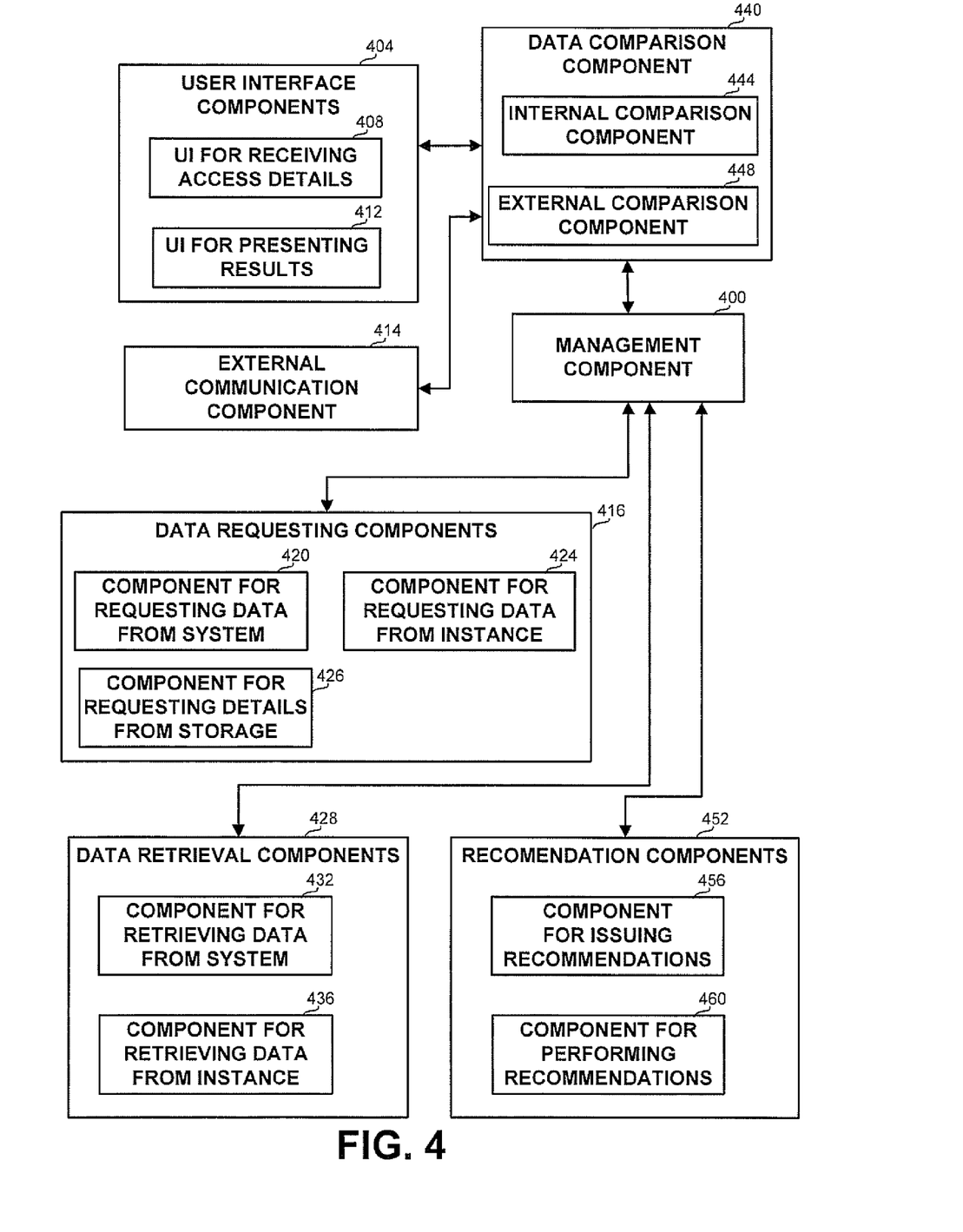
FIG. 4 is a block diagram of the main components in a preferred embodiment of an apparatus in accordance with the disclosure.

Referring now to FIG. 4, showing a block diagram of the main components in a preferred embodiment of an apparatus of the disclosure. The apparatus is preferably a tool which can be implemented as software or firmware programmed in any programming language and under any development environment, executed by any computing platform in communication with the first computing platform executing the first instance or the second computing platform executing the second instance. The tool can alternatively be executed by either the first computing platform or the second computing platform.

The apparatus preferably comprises a management component 400 for controlling the flow of the tool and for activating specific components. Thus, management component 400 is in communication with the other components of the tool. The apparatus comprises user interface components 404, further comprising user interface component 408 for receiving access details for the first or the second instance, and user interface component 412 for presenting or reporting results to a user, in any required way, including text, tables, graphs, or others. The report is displayed on a display device, sent by e-mail or another computerized message, faxed, stored in a storage device or in a database or the like. Some of the reporting can be performed as a part of the apparatus or by an extension such as a plug-in or another programming unit associated with the apparatus. Other parts can be implemented and activated as part of the first instance or the second instance, for example reporting results having proprietary format, unfamiliar to the apparatus.

The apparatus further comprises external communication component 414 for communicating with the first or the second computing platform. Component 414 can further enable communication for receiving access details and instructions from an external entity such as another program or another computing platform, or for sending the comparison results to the external entity.

Further components include data requesting components 416 for requesting parameter value from the first or the second instance. Data requesting components 416 comprise component 420 for requesting data, preferably parameter value, from the computing platform or environment of the first instance, such as data related to the hardware, the operating system or other parameters not directly associated with the installed application. Data requesting components 416 further comprise component 424 for requesting data from the first instance or the second instance. Alternatively, component 424 can be used for requesting a list of parameters from the first instance or from the second instance. Data requesting components 416 further comprise component 426 for retrieving details of a system from a storage unit such as a database. Component 426 is used when details of at least one of the systems were off line retrieved and stored in a storage device, from which they are to be retrieved and compared to the other system, rather than being online retrieved from the system and application.

Yet another group of components is data retrieval components 428 for retrieving the parameter values. Data retrieval components 428 comprise component 432 for retrieving data from the system, such as parameter values relating to hardware, operating system, or the like. Component 432 can be performed by directly accessing the relevant areas of the system, such as the registry, and retrieving the information. Alternatively, component 432 can be implemented as a programmatic unit, such as a daemon accessed via an interface and supplying the values. Data retrieval components 428 further comprise component 436 for retrieving data from the first instance or the second instance. Component 436 is preferably implemented as part of the installed application, portal, service or the like, since the instance itself has the most intimate knowledge about the parameters that can influence its behavior, including installed components, versions, updates, dependencies and others. Component 436 can be designed to supply values for particular parameters, or to supply a list of parameter identifiers, along with values, and optionally additional data and reporting or comparison mechanisms, function addresses, computerized unit, or the like.

The apparatus further comprises data comparison components 440 for comparing the values of the various parameters. Data comparison components 440 comprise internal comparison component 444 for comparing values by the apparatus itself, for example simple numerical or string values. Internal comparison components 444 may also use extensions such as plug-ins or other computerized units for comparing proprietary data.

Data comparison components 440 may also comprise external comparison component 448 for comparing values of complex or proprietary types. External comparison component 448 is preferably implemented by the instance itself which is qualified for comparing values associated with it, or by another unit not associated with the apparatus.

The apparatus optionally further comprises suggestion components 452. Components 452 comprise component 456 for issuing recommendations to a user based on the differences between the systems. The recommendations can relate to replacing hardware, updating software, communication, or the like. Components 452 further comprise component 460 for automatically performing the recommendations, when such recommendations can be carried out automatically, for example downloading and installing software, changing database parameters, or the like.

The disclosed method and apparatus enable a user to compare two computing platforms executing the same program, application, portal, or another unit and realize why one platform functions as expected while the other one does not. The method and apparatus query and retrieve the values of multiple parameters associated with the application and the environment, compare the values and report the differences. Some parameters may be common to all applications, such as hardware or operating system parameters, some may be relevant to multiple applications, such as database parameters, while yet others may depend on the particular application or its installation.

It will be appreciated by a person skilled in the art that multiple variations and options can be designed along the guidelines of the disclosed method. The functionality of the apparatus may be distributed among a dedicated tool, add-ins and other configurable units associated with the tool, independent daemons, parts of the compared application and others. It will be further appreciated that the type and number of parameters to be compared is not limited in any way, and can be related to any aspect of any system, currently known or that will become known in the future.

In the context of the disclosure, the terms executable, computerized unit, function, component and others are used interchangeably to indicate a functional unit comprising computer instructions, for performing one or more tasks. Each computerized unit can be a function of an executable, an executable in itself, a function, a method, an application, a script, a service, a web service, a portal, a static library, a dynamic link library, or any other unit.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. In a computer network comprising a first computing platform and a second computing platform, the first computing platform executes or has installed thereon a first instance of a computerized unit, and the second computing platform executes or has installed thereon a second instance of the computerized unit, each providing an outcome, and wherein the outcome of the first instance on the first computer platform differs from the outcome of the second instance on the second computer platform, an apparatus for retrieving the differences between the first computing platform and first instance, and the second computing platform and second instance the apparatus comprising:

a component for receiving access details of the first computing platform or of the second computing platform;

a data requesting component for issuing a request for information related to the first computing platform or the second computing platform or the first instance or the second instance;

a data retrieval component for retrieving a first value associated with a parameter from the first computing platform or from the first instance and a second value associated with the parameter from the second computing platform or from the second instance;

a comparison component for comparing the first value and the second value to determine at least one difference between the first computing platform and first instance and the second computing platform and second instance, that may lead to the difference in the outcome of the first and second instances on the two platforms; and a component for reporting the at least one difference.

2. The apparatus of claim 1 further comprising an external computing unit for comparing the first value and the second value.

3. The apparatus of claim 1 further comprising an external reporting unit for reporting the at least one difference.

4. The apparatus of claim 1 wherein the component for receiving access details is a user interface component.

5. The apparatus of claim 1 wherein the component for receiving access details is a communication component for communicating with another entity.

6. The apparatus of claim 1 wherein the data requesting component requests a parameter value from the first computing platform or from the second computing platform.

7. The apparatus of claim 6, wherein the data requesting component requests the data from a daemon executed by the first computing platform or from the second computing platform.

8. The apparatus of claim 1 wherein the data requesting component requests a parameter value from the first instance or from the second instance.

9. The apparatus of claim 1 wherein the data requesting component requests data from a storage unit, wherein the data was retrieved offline and stored in the storage unit.

10. The apparatus of claim 1 wherein the data requesting component requests a list of parameters from the first instance or from the second instance.

11. The apparatus of claim 10 wherein the list of parameters further comprises for each parameter an at least one item selected from the group consisting of: a value; additional data; comparison instructions, Application Program Interface for comparing; Application Program Interface for reporting; an address of an executable unit for comparing; and an address of an executable unit for comparing.

12. The apparatus of claim 1 wherein the first instance or the second instance comprise the comparison component.

13. The apparatus of claim 1 wherein the first instance or the second instance comprise the reporting component.

14. The apparatus of claim 1 wherein the request for information relates to at least on item selected from the group consisting of: hardware equipment; CPU; memory; disk space; operating system; registry; database installation; J2EE version; .NET version; portal contents; an installed service, an activated service, a paused service or a version or an update thereof; log or trace file; language; time zone; a regional setting; an installed version or update for a component of the first instance or the second instance; component installation order; deployed component or deployment order; connectivity; an internet parameter; a configuration; a user setting; and an authorization.

15. The apparatus of claim 1 wherein the apparatus is executed by the first computing platform or the second computing platform.

16. The apparatus of claim 1 wherein the apparatus is executed by a third computing platform.

17. The apparatus of claim 1 further comprising a component for issuing an at least one recommendation to the user.

18. The apparatus of claim 17 further comprising a component for automatically performing the at least one recommendation.

19. In a computer network comprising a first computing platform executing or having installed thereon a first instance of a computerized unit and a second computing platform executing or having installed thereon a second instance of a computerized unit, each providing an outcome, and wherein the outcome of the first instance on the first computer platform differs from the outcome of the second instance on the second computer platform, a method for retrieving the differences between the first computing platform and first instance, and the second computing platform and second instance, the method comprising:
- receiving access details of the first computing platform or the second computing platform;
- requesting data related to the first computing platform or the second computing platform or the first instance or the second instance;
- receiving a first value associated with a parameter from the first computing platform or from the first instance;
- receiving a second value associated with the parameter from the second computing platform or from the second instance;
- comparing the first value and the second value to determine at least one difference between the first computing platform and first instance and the second computing platform and second instance, that may lead to the difference in the outcome of the first and second instances on the two platforms; and
- if the first value is different from the second value, reporting the difference between the first value and the second value to a user.

20. The method of claim 19 wherein comparing the first value and the second value is performed by the first instance or by the second instance, or by an external tool.

21. The method of claim 19 wherein reporting the difference between the first value and the second value is performed by the first instance or by the second instance, or by an external tool.

22. The method of claim 19 wherein the access details are received from a user.

23. The method of claim 19 wherein the access details are received from a computerized unit.

24. The method of claim 19 wherein the first value is received from the first computing platform, the first instance, or a daemon executed by the first computing platform.

25. The method of claim 19 wherein the second value is received from the second computing platform, the second instance, or a daemon executed by the second computing platform.

26. The method of claim 19 wherein the data received from the first instance or the second instance or the first instance or the second instance comprises a parameter identifier and a parameter value.

27. The method of claim 26 wherein the data further comprises additional data related to the parameter; comparison instructions; Application Program Interface for comparing the first value and the second value; Application Program Interface for reporting the difference; an address of an executable unit for comparing the first value and the second value; or an address of an executable unit for reporting the difference.

28. The method of claim 19 wherein the requested data relates to at least one item selected from the group consisting of: hardware equipment; CPU; memory; disk space; operating system; registry; database installation; J2EE version; .NET version; portal contents; an installed service, an activated service, a paused service or a version or an update thereof; log or trace file; language; time zone; a regional setting; an installed version or update for a component of the first instance or the second instance; component installation order; deployed component or deployment order; connectivity; an internet parameter; a configuration; a user setting; and an authorization.

29. The method of claim 19 wherein the method is executed by the first computing platform or the second computing platform.

30. The method of claim 19 wherein the method is executed by a third computing platform.

31. The method of claim 19 wherein the step of requesting data comprises requesting the data from a storage unit.

32. The method of claim 19 further comprising a step of issuing an at least one recommendation to the user.

33. The method of claim 32 further comprising a step of automatically performing the at least one recommendation.

34. A non transitory computer readable storage medium containing a set of instructions for being executed in a general purpose computer, the set of instructions comprising:
- receiving access details of a first computing platform or a second computing platform;
- requesting data from the first computing platform, or the second computing platform, or a first instance executed by or installed on the first computing platform, or a second instance executed by or installed on the second computing platform each providing an outcome;
- receiving a first value associated with a parameter from the first computing platform or from the first instance;
- receiving a second value associated with the parameter from the second computing platform or from the second instance;
- comparing the first value and the second value to determine at least one difference between the first computing platform and first instance and the second computing platform and second instance, that may lead to a difference in the outcome of the first and second instances on the two platforms; and
- if the first value is different from the second value, reporting the difference between the first value and the second value to a user.

* * * * *